United States Patent [19]

Link

[11] Patent Number: 5,722,784
[45] Date of Patent: Mar. 3, 1998

[54] KINGPIN ASSEMBLY

[75] Inventor: Larry R. Link, Frankfort, Ill.

[73] Assignee: American Roller Bushing Corporation, Monee, Ill.

[21] Appl. No.: 568,349

[22] Filed: Dec. 6, 1995

[51] Int. Cl.[6] ......................................... F16J 1/16
[52] U.S. Cl. ...................... 403/158; 403/119; 403/157; 280/96.1
[58] Field of Search .................... 403/157, 158, 403/159, 161, 150, 151, 152, 153, 154, 156, 119, 79; 384/462, 474, 473, 565; 280/96.1

[56] References Cited

U.S. PATENT DOCUMENTS

| | | | |
|---|---|---|---|
| 1,287,143 | 12/1918 | Troxler | 403/156 X |
| 1,471,575 | 10/1923 | Simons | 280/96.1 |
| 1,568,782 | 1/1926 | Swayne | 403/156 X |
| 2,094,945 | 10/1937 | Hesselrode | 280/96.1 |
| 3,477,771 | 11/1969 | Herbenar | 280/96.1 |
| 3,915,469 | 10/1975 | Vanice | 303/154 X |
| 4,229,017 | 10/1980 | Hagedorn | 280/96.1 |
| 4,286,799 | 9/1981 | Ayres | 403/154 X |
| 4,798,394 | 1/1989 | Pollock et al. | 280/96.1 |
| 5,350,183 | 9/1994 | Shealy | 403/355 X |

Primary Examiner—Anthony Knight
Assistant Examiner—William L. Miller
Attorney, Agent, or Firm—Fitch, Even, Tabin & Flannery

[57] ABSTRACT

A kingpin assembly for heavy duty vehicles having upper and lower yokes of a steering spindle knuckle straddling upper and lower sides of an end portion of an axle. The upper and lower steering spindle yokes have respective bores in registration with a bore in the axle end portion. A kingpin has a central portion fixedly secured within the axle bore, and has opposite, accurately machined and polished end portions disposed within respective upper and lower steering spindle yoke apertures. There is an annular gap between the peripheries of the kingpin end portions and the interior surfaces of the steering spindle yoke bores. An annular sleeve resides within the gap. A pair of roller bearings are mounted in spaced relation internally of the sleeve, with a grease reservoir being defined in the space between adjacent roller bearings. The roller bearings have an outer race mounted in a stationary position on the internal wall of the sleeve. Rolling elements are disposed between the kingpin end peripheries and the respective races for rolling surface contact with the peripheries of respective kingpin ends and races to provide low friction oscillatory movement of the steering spindle knuckle with respect to the axle end.

14 Claims, 4 Drawing Sheets

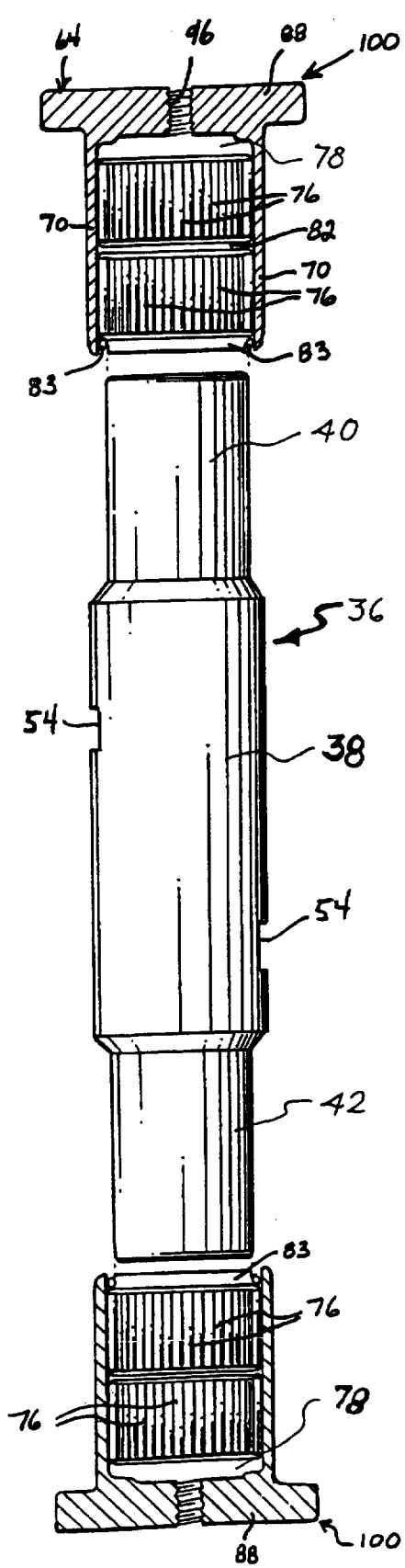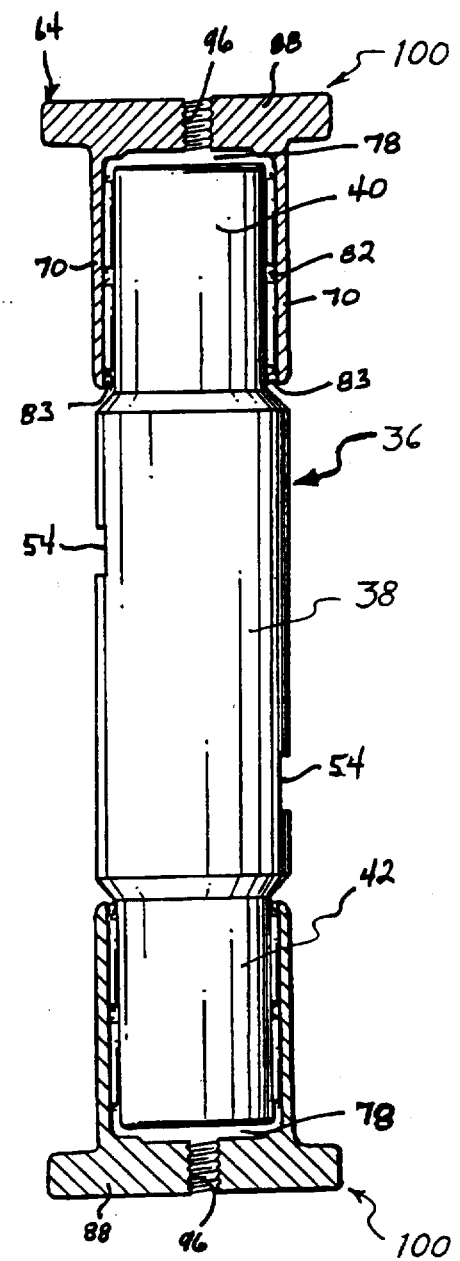
Fig. 2
Fig. 3

1

KINGPIN ASSEMBLY

FIELD OF THE INVENTION

The present invention pertains to kingpin assemblies, and more particularly, pertains to kingpin assemblies and a method of their use in heavy duty motor vehicles.

BACKGROUND OF THE INVENTION

Kingpin assemblies, used in heavy motor vehicles such as trucks and the like, consist generally of a circularly cylindrical kingpin extending through a substantially vertical bore in a vehicle front axle, and through integral upper and lower yokes of a steering spindle knuckle which straddle the axle end. The central portion of the kingpin is fixedly secured within the bore of the front axle, with the upper and lower ends of the kingpin residing within respective upper and lower yokes of the steering spindle knuckle. The steering spindle knuckle is pivotable relative to the kingpin and oscillates about the upper and lower kingpin ends which project above and below the axle.

In heavy duty truck applications, the bearing load on the kingpin is often 12,000 or 13,000 lbs. minimum. To take such loads, the kingpins are journaled in brass bronze bushings that are typically 1¾ inches in height and 1½ inches diameter, and nominally should last for 100,000 miles. If not greased properly, these bushings usually last 80,000 miles or less or they may, when greased properly, last as much as 150,000 miles. Some kingpin assemblies use a thicker brass bushing of 2.00 inches diameter which nominally should last 300,000 miles; but when not properly greased, they usually last about 200,000 to 225,000 miles. One reason that the kingpin assemblies for heavy duty applications are not greased timely and properly is that the wheel on the spindle of the kingpin assembly must be jacked off the ground to relieve the pressure of the kingpin against the bushing to allow grease to flow entirely about the kingpin and the bushing. The jacking of the wheels is a time-consuming and costly process that is also dangerous; and consequently, truckers are reluctant to do it. Furthermore, there is a problem of a gasket being blown out during a greasing operation, particularly when the temperature is very cold. The kingpin assembly has a cap with a grease fitting over the gasket; and in cold temperature, the grease may be pumped at such high pressures through a grease fitting on the cap that the gasket is blown out.

The kingpins in heavy duty applications are heavy and expensive, e.g., 50 lbs. in weight and a cost of $700 may be typical. Often in these conventional kingpin assemblies, the spindle becomes worn and then the spindle is removed and honed down in diameter at its ends; and then a thicker bushing must be used with the smaller diameter, honed spindle end. If the bushing becomes too worn, the kingpin will gouge the bore wall in the yoke of the steering spindle knuckle. It is a very expensive operation to remove and to replace a damaged kingpin, and to rebore the steering spindle knuckle.

Furthermore, these traditional kingpin assemblies with brass bronze bushings are not designed to provide long term lubrication because the load on the kingpin causes the kingpin to bear at a point or line of contact with the bushing wall with sufficient pressure to squeeze the grease away from the point or line of contact. Without lubrication precisely where it is most needed at the point of contact, the kingpin and bushing wear more quickly and may ultimately fail.

Some trucks sold by Volvo White Truck Corporation used needle bearings rather than brass bushings to journal the kingpins for turning movement. However, it is recommended that for a lubrication of these needle bearings, that the front axle be lifted so that there is no load on the wheels. Also, because the needle bearings are force-fitted into the bore in the yokes of steering knuckles, they are difficult to replace.

It is not uncommon to replace conventional bushings or bearings several times during the useful life of a heavyweight vehicle. Hence, improved life for the kingpin bearings and an easier manner of removal of these bushings or bearings, than the usual removal of high pressure tools to remove them from their press fit tightly in the yokes are highly desirable. Additionally, there is a need for an improved kingpin assembly and its bearings that are not prohibitively costly and can be used with conventional yokes of existing trucks for use in the retrofit market as well as for use in the original equipment market.

In some instances for lighter duty applications, tapered, plastic bushings and tapered ends on the kingpin have been proposed, such as in U.S. Pat. No. 3,477,771. However, plastic bushings cannot withstand the 12,000 lb. or greater loads that are used in heavy trucks and will fail; and the tapered ends of the kingpins will lift up the tapered bushings at 12,000 lbs. of force. Hence, such a construction is not practical for use in heavy duty trucks.

SUMMARY OF THE INVENTION

In accordance with the present invention, there is provided a new and improved kingpin assembly for heavy duty trucks that provides longer term lubrication of the kingpin and its bearings. This is achieved by providing roller bearings in a cartridge with a grease reservoir between the bearings. Preferably, grease is applied through a closed cap end of the cartridge that does not have a gasket to be blown out; and grease travels between the needle rollers of the bearings and into a reservoir space between upper and lower sets of needle bearings in the cartridge. Grease may be applied to the needle bearings while the truck wheels are still on the ground. This eliminates the conventional time-consuming and potentially dangerous job of jacking up the truck wheels and then working under the truck to grease the wheels. The preferred construction is inexpensively made with conventional, low-price needle bearings with the polished steel kingpin spindle end serving as the inner race for the bearings and with a highly polished steel cylindrical bore surface on the cartridge serving as outer race for the needle bearings.

The preferred cartridge is easily removable with its bearings sliding off the spindle end as the cartridge is removed. Preferably, the cartridge is press-fitted into a bore of a yoke of the steering spindle. To remove the cartridge from this bore, a threaded screw may be threaded into a threaded grease opening in the end cap wall of the cartridge to bear against the adjacent outer end of the kingpin; and continued rotation of the screw will pull the cartridge from the bore in the yoke. The preferred cartridge has a shoulder or lip below the inner needle bearing which engages and pulls the bearings from the kingpin spindle ends as the screw is turned.

If the needle bearings should fail, the spindle ends may score or damage the cartridge sleeve wall but the yoke wall is still protected from scoring by the spindle end. In a conventional bushing, once the bushing is worn or fails, the spindle is free to score the axial bore wall in the yoke.

The peripheral surface of the kingpin end may be precisely machined to predetermined tolerances to have a close fit with the bearing element inner surfaces so as to reduce road pounding motion therebetween. Also, the peripheral surface of the kingpin end may be highly polished to provide smooth rolling engagement with the bearing inner surfaces. The inner surface of the sleeve may also be precisely machined and highly polished for supporting the outer races of the roller bearings. With this kingpin assembly, the rolling elements roll relative to the outer races of the machined kingpin end portion to provide low friction oscillatory movement of the steering spindle knuckle with respect to the axle. Advantageously, the inner side of the rolling elements roll against the periphery of the kingpin end and outer side of the rolling elements roll against the outer race, with the rolling elements maintaining the kingpin ends centrally within their respective steering spindle bores to prevent contact between the kingpin ends and the internal surfaces defining their respective steering spindle bores.

The present invention is also directed to the method of assembling and disassembling kingpins and their bearings, and it includes the steps of providing upper and lower cartridges having bodies with cylindrical sleeves carrying roller bearings therein; inserting a kingpin into a bore into an end portion of an axle and into upper and lower bores in a steering spindle; force-fitting the cylindrical sleeves of the supper and lower cartridges into the upper and lower spindle bores and telescoping the respective roller bearings onto the spindle ends to dispose the roller bearings between highly polished surfaces on the spindle ends and on inner cylindrical surfaces of the sleeves; securing a cap end on the cartridge body to the outer end surfaces of upper and lower steering spindle yokes; and through openings in the cap end of the cartridges, forcing grease into the roller bearings and onto the highly polished surfaces on the kingpin ends and onto the interior cylindrical surfaces of the sleeves to provide a low friction oscillatory movement of the steering spindle with respect to the end portion of the axle.

In one embodiment, standard needle bearings may be employed to further reduce the costs of the kingpin assembly of the present invention.

BRIEF DESCRIPTION OF THE DRAWINGS

In the drawings, wherein like elements are referenced alike:

FIG. 2 is a partially exploded sectional view of the kingpin and knuckle cap arrangement of the kingpin assembly of FIG. 1;

FIG. 3 is a sectional view of the kingpin and knuckle cap arrangement of FIG. 2, shown with the knuckle caps engaged to the kingpin ends;

DETAILED DESCRIPTION OF THE PREFERRED EMBODIMENTS

Figure 1:
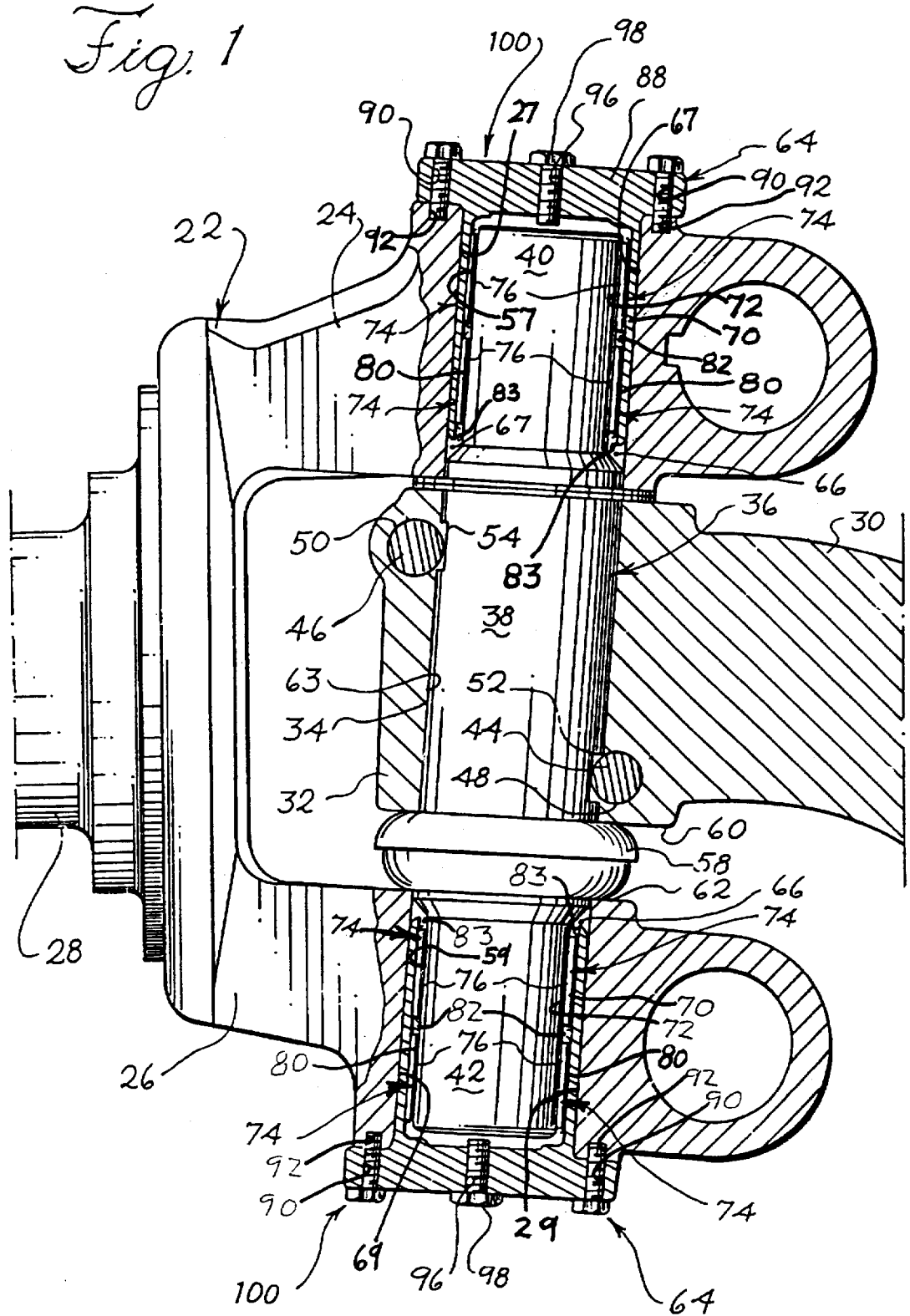
FIG. 1 is a sectional elevational view of a kingpin assembly embodying various features of the present invention.

A kingpin assembly embodying various features of the present invention, and suitable for use with heavy duty vehicles, is illustrated in FIG. 1. A steering spindle knuckle, indicated generally at 22, has integral upper and lower yokes 24 and 26, with respective bores 27 and 29, and an integral spindle 28 on which a wheel is rotatably mounted for rolling transport of the vehicle. The vehicle has a portion of its load supported on a generally horizontal beam or axle 30, having a pair of opposite end portions 32 (only one of which is shown in FIG. 1), with an axle bore 34 extending generally vertically through both of the end portions of the axle 30. The pair of opposite end portions 32 of the axle 30 are pivotally connected to respective steering spindles 22 through respective kingpins 36 extending through the respective bores 34, 27 and 29 of the axle 30 and steering spindle yokes 24 and 26.

The illustrated kingpin 36 has a central portion 38 and a pair of opposite upper and lower end portions 40 and 42. The central portion 38 of the kingpin 36 is fixedly secured within the axle bore 34 by means of a pair of axially spaced tapered lock pins 44 and 46 pressed through respective tapered channels 48 and 50 through the axle 30 and corresponding straight notches 52 and 54 formed into the peripheral surface of the central portion 38 of the kingpin 36. In this manner the kingpin 36 is held in the axle bore 34 against rotation and against vertical displacement along its longitudinal axis. The upper and lower end portions 40 and 42 of the kingpin 36 extend outwardly of the axle bore 34, and reside respectively above and below the axle 30. In the embodiment of FIGS. 1-3, the end portions 40 and 42 of the kingpin 36 are of reduced diameter relative to the central portion 38, although a kingpin having end portions of the same diameter as the central portion may also be employed as described further below and illustrated in FIGS. 4 and 5.

The upper and lower yokes 24 and 26 of the steering spindle knuckle 22 straddle the end portion 32 of the axle 30, with the bores 27 and 29 of the upper and lower yokes 24 and 26 of the steering spindle knuckle 22 being in registration with the axle bore 34. The upper end 40 of the kingpin 36 resides within the bore 27 of the upper yoke 24 of the steering spindle knuckle 22, and the lower end 42 of the kingpin 36 resides within the bore 29 of the lower yoke 26 of the steering spindle knuckle 22. The steering spindle knuckle 22 is pivotable about the upper and lower ends 40 and 42 of the kingpin 36 so that the steering spindle knuckle 22 can oscillate about the end portion 32 of the axle 30.

An annular, tapered thrust bearing 58 is disposed between the lower end 60 of the axle and the upper surface 62 of the lower yoke 26 of the steering spindle knuckle 22. The thrust bearing 58 transmits the load from the axle 30 to the lower yoke portion 26. The thrust bearing 58 is selected based upon its capacity to withstand heavy loads of the type associated with heavy vehicles. A tapered thrust bearing with a 3,000 pound capacity has been found suitable for typical heavy load applications, since each bearing is only required to support approximately ¼ of the load of the vehicle.

In the embodiment illustrated in FIG. 1, the bores 27 and 29 of the upper and lower yokes 24 and 26 of the steering spindle knuckle 22 are of approximately the same diameter as the axle bore 34. The central portion 38 of the kingpin 36 is of approximately the same diameter of the axle bore 34 so that there is a close fit between the central portion 38 of the kingpin 36 and the annular surface 63 defining the axle bore 34. The kingpin 36, having end portions 40 and 42 smaller than the central portion 38, is employed to provide an annular space or gap 66 between the peripheral surfaces 57 and 59 of the kingpin end portions 40 and 42 and the interior surfaces 67 and 69 defining the respective steering spindle bores 27 and 29 when the kingpin end portions 40 and 42 are centered within their respective steering spindle bores 27 and 29.

In order to allow low friction oscillation of the steering spindle knuckle 22 about the kingpin ends 40 and 42, in a manner which requires low maintenance and allows easy lubrication about the entire peripheral surfaces 57 and 59 of the respective kingpin ends 40 and 42 without requiring raising of the vehicle, sleeve and bearing arrangements, referred to generally by reference numeral 64, are employed.

A first embodiment of a sleeve and bearing arrangement 64 suitable for use in the kingpin assembly of the present invention is illustrated in FIGS. 1-3 and FIG. 6. The arrangement comprises annular sleeves 70 which are telescopically received in the annular gaps 66 between the peripheral surfaces 57 and 59 of the kingpin ends 40 and 42 and the interior surfaces 67 and 69 of the respective upper and lower steering spindle yokes 24 and 26. That is, first and second annular sleeves 70 are provided, each having an interior wall 72 defining a cylindrical internal sleeve bore. The first and second sleeves 70 are secured within respective upper and lower steering spindle bores 27 and 29, with the sleeves 70 being received in respective annular gaps 66 between the peripheral surfaces 57 and 59 of the respective kingpin end portions 40 and 42 and the internal surfaces 67 and 69 of the respective upper and lower steering spindle yokes 24 and 26.

Conventional kingpin assemblies employ an annular sleeve made of brass or the like to line the internal surfaces of the steering spindle bores and serve as a bushing to reduce friction and reduce wear to the surfaces defining the steering spindle bores. As discussed above, conventional bushings have numerous shortcomings including requiring that the vehicle be raised to remove the load to the kingpin assembly during greasing in order to properly grease about the entire periphery of the kingpin end portions.

In accordance with the present invention, in order to allow greasing about the entire periphery of the kingpin end portions, the sleeves 70 each have a pair of roller bearings, referred to generally at 74, mounted in their respective sleeve bores in spaced relation from one another. The roller bearings 74 each have a plurality of internal rolling elements 76 which define respective internal openings 78 within the roller bearings 74 into which the kingpin end portions 40 and 42 are received. The roller bearings 74 also have an outer race 80 for supporting the rolling elements 76 and for rolling contact of the internal rolling elements 76 against the outer race 80.

With the kingpin end portions 40 and 42 received in respective internal openings 78, the rolling elements 76 maintain the kingpin ends 40 and 42 centered within their respective steering spindle apertures 27 and 29, so that even in a loaded condition no portion of the kingpin ends 40 and 42 contacts the sleeve 70. This is in contrast with utilization of the aforementioned conventional bushings wherein one side of the periphery of the kingpins contacts the bushings in a loaded condition. Grease can pass easily between adjacent rolling elements 76 of the plurality of rolling elements 76 associated with the roller bearings 74, and thus pass easily between the peripheral surfaces 57 and 59 of the kingpin end portions 40 and 42 and their respective steering spindle bore surfaces 27 and 29, regardless of whether or not the kingpin assembly is subject to loading.

Upon oscillation of the steering spindle knuckle 22 with respect to the kingpin ends 24 and 26, the peripheral surfaces 57 and 59 of the kingpin end portions 40 remain in contact with the inner surfaces of the respective rolling elements 76 and there is rolling surface contact between the inner surfaces of the rolling elements and the peripheries of the kingpins. The peripheral surfaces 57 and 59 of the kingpin end portions 40 and 42 are precisely machined to predetermined tolerances to have a close fit engagement with the inner surfaces of the rolling elements 76. The close fit engagement between the peripheral surfaces 57 and 59 of the kingpin end portions 40 and 42 and the rolling elements 76 reduces road pounding motion between the peripheral surfaces 57 and 59 and their respective rolling elements 76. The peripheral surfaces 57 and 59 of the kingpin end portions 40 and 42 are highly polished to provide smooth rolling engagement with the rolling elements 76.

The interior wall 72 of the sleeves 70 are also precisely machined and polished. The outer annular races 80 of the roller bearings 74 are press fitted into the sleeve 70 so that the sleeve 70 and the races 80 are combined into what acts as almost a composite race for the internal rolling elements 76. The sleeve 70 thus, in effect, assures that the races 80 are sufficiently strong and smooth that over the life of the roller bearings 74 so that the internal rolling elements 76 run between two very smooth and precise surfaces with rolling contact that will not damage the roller bearings themselves. This smooth rolling contact results in reduced friction. Because the precision machined hard surfaces on the sleeve 70 and kingpin ends 40 and 42 retain the bearings therebetween, low cost and standard roller bearings may be used, thereby avoiding the need for specialized, high cost roller bearings.

Upon oscillation of the steering spindle knuckle 22 with respect to the end portion 32 of the axle 30, the rolling elements roll relative to their races 80 and roll relative to the machined peripheral surfaces 57 and 59 of the kingpin end portions 40 and 42 to provide low friction oscillatory movement of the steering spindle knuckle 22 with respect to the end portion 32 of the axle 30.

In the preferred embodiment of the invention, the kingpin assembly of the present invention also provides a long service life with a minimum of maintenance. This is achieved by the positioning of the pair of roller bushings 74 disposed in each sleeve 70 in spaced relation from one another. A grease cavity or reservoir 82 is defined internally of the sleeve 70 in the region between the pair of roller bearings 74. The grease reservoir 82 receives and retains grease, with grease in the reservoir 82 supplying grease to the rolling elements 76 even though a standard lubrication period is missed. That is, while the roller bushings 74 still need to get greased at regular intervals, the time between greasings may be extended without much harm to the roller bushing 74 because of the large grease reservoir 82 supplying grease to the roller bushings 74. An annular grease seal 83 is provided near the end of the sleeve 70 which maintains contact with the periphery of the kingpin end portions 40 and 42 to retain grease in the bearing region.

In the preferred embodiment of the invention, the sleeves 70 have an integral cap or flange 88, as illustrated in FIGS. 1-3 and FIG. 6. The flange 68 has means for engagement with a respective upper or lower steering spindle yoke 24 or 26, which engagement means is preferably in the form of threaded apertures 90 in the flange 88 through which bolts 94 are threaded. The leading end portion of the bolts 94 are threaded through the apertures 90 in the flange 88 and into corresponding threaded apertures 92 in the steering spindle yokes 24 and 26. The bolts 94 secure the flanges 88 securely to their respective steering spindle yokes 24 and 26, thereby securing their integral sleeves 70 in operative position between the peripheral surfaces 57 and 59 of the kingpin end portions 40 and 42 and their respective steering spindle bore surfaces 27 and 29.

The flanges 88 have a threaded, centrally located threaded greasing aperture 96 for injecting grease into the internal portion 78 of the sleeve 70 for lubrication of the roller bearings 74. A bolt 98 is threadably engageable into the threaded greasing aperture 96 to seal the flange aperture 96 so as to seal in the grease. Since the flanges 88 are integral with their respective sleeves 70, the problem of grease being forced out between the bushing and sealing cap which is realized with conventional arrangements is eliminated. That is, in conventional bushing arrangements, the bushing is not integral with the sealing cap used to seal the steering spindle bores and it is necessary to use a gasket between the sealing caps and the steering spindle yokes to effect proper sealing in of the grease. Frequently, when injecting grease to grease the kingpin, the pressure forces the grease out between the cap and the steering spindle, resulting in inadequate greasing of the inner kingpin portions. This is particularly common when attempting to grease in cold weather.

The preferred sleeve 70 is made from a hard material and generally similar to the bearing material itself. The sleeve in the preferred embodiment is made of ASTM 52100 bearing steel. Use of bearing steel prevents distortion during thermal expansions and contractions because the coefficient of thermal expansion of the sleeve 70 is matched to that of the roller bearings 74. Without such matching, the benefits of extensive efforts to create a precision device can be lost, sometimes even if the temperature variation is only a few degrees. In addition to atmospheric temperature variations, there is transformation of mechanical energy into heat realized upon oscillation of the steering spindle knuckle 22. These temperature variations combine to create the possibility of accelerated bearing wear, which likelihood is reduced by matching the thermal expansion coefficients of the elements of the kingpin assembly.

With the knuckle caps of the present invention, the machine time and associated expense of accurately honing out the steering spindle bores 27 for press fitting of bushings is not necessary. Even if the steering spindle bores 27 and 29 are not honed out accurately, the sleeve and bearings mounted internally thereof make up for any minor inaccuracies.

In the preferred embodiment, an integral component comprised of the sleeve 70, the pair of internally mounted roller bearings 74, and the flange 88 is provided, which integral component is referred to as a "knuckle cap". The provision of the integral knuckle cap 100 is particularly well suited for use in retrofitting applications. The knuckle caps 100 may be made of predetermined sizes corresponding to the conventional size of the kingpins and steering spindle bores found in the kingpin assemblies of contemporary vehicles. The sleeves 70 of the knuckle caps 100 are thus slidably insertable and removable into respective steering spindle bores 27 and 29, into respective annular gaps 66 between the peripheral surfaces 57 and 59 of the kingpin end portions 40 and 42 and the internal surfaces 67 and 69 defining the steering spindle bores 27 and 29. Upon wearing out of the bearings 74 of the knuckle cap 100, the knuckle cap is slidably removed from its respective steering spindle bore and another knuckle cap is slidably inserted into the steering spindle bore, without the extensive machining required with replacement of conventional bushings. FIG. 2 illustrates a pair of knuckle caps 100 in spaced relation from a kingpin 36, and FIG. 3 shows the knuckle caps 100 engaged with respective end portions 40 and 42 of the kingpin 36.

Figures 4, 5:
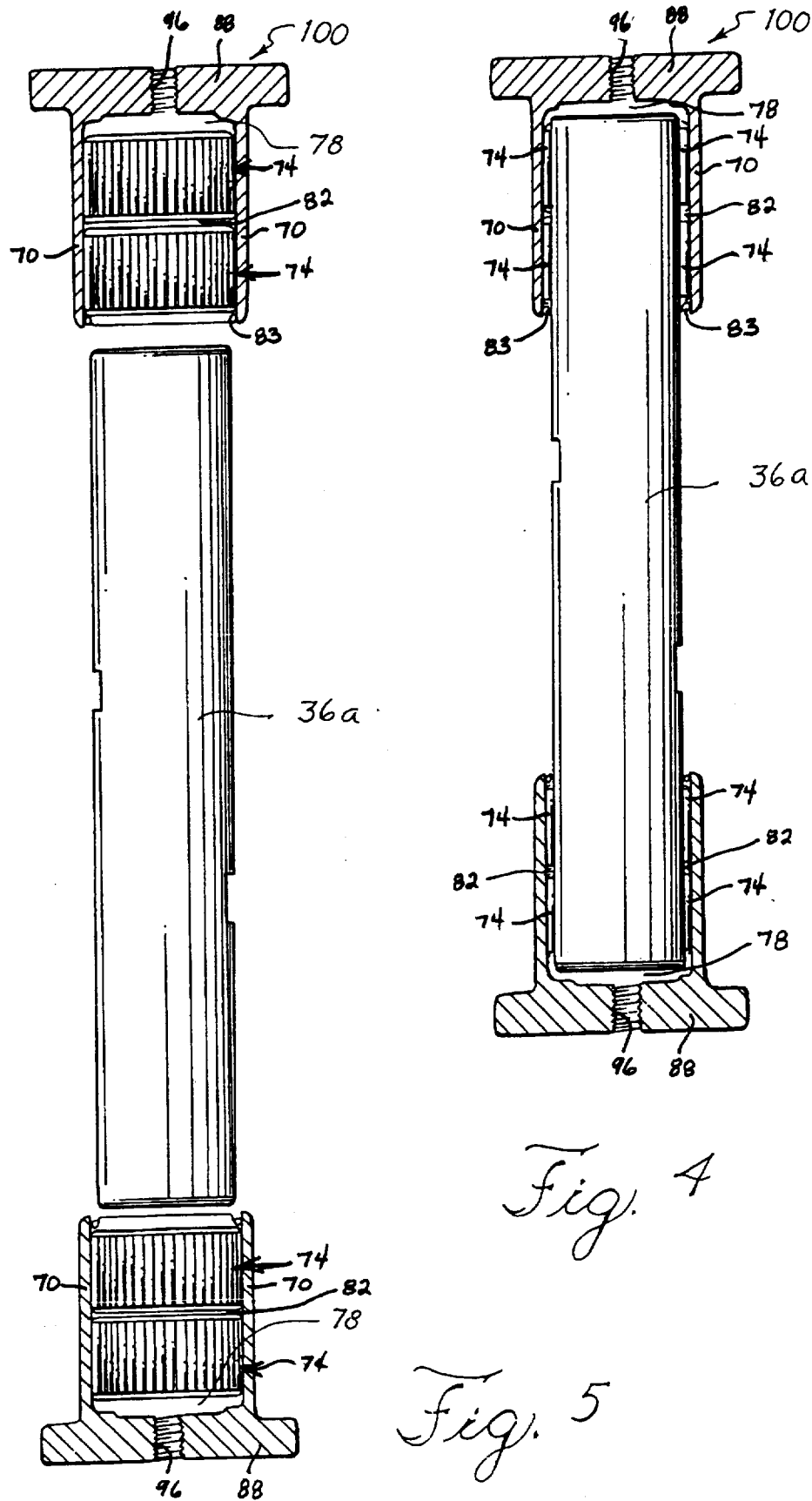
FIG. 4 is a partially exploded view of an alternative kingpin and knuckle cap arrangement suitable for use in the kingpin assembly of the present invention, illustrating a kingpin having substantially uniform diameter along its length.
FIG. 5 is a sectional view of the alternative kingpin and knuckle cap arrangement of FIG. 4, shown with the knuckle caps engaged to the kingpin ends.
Figure 6:
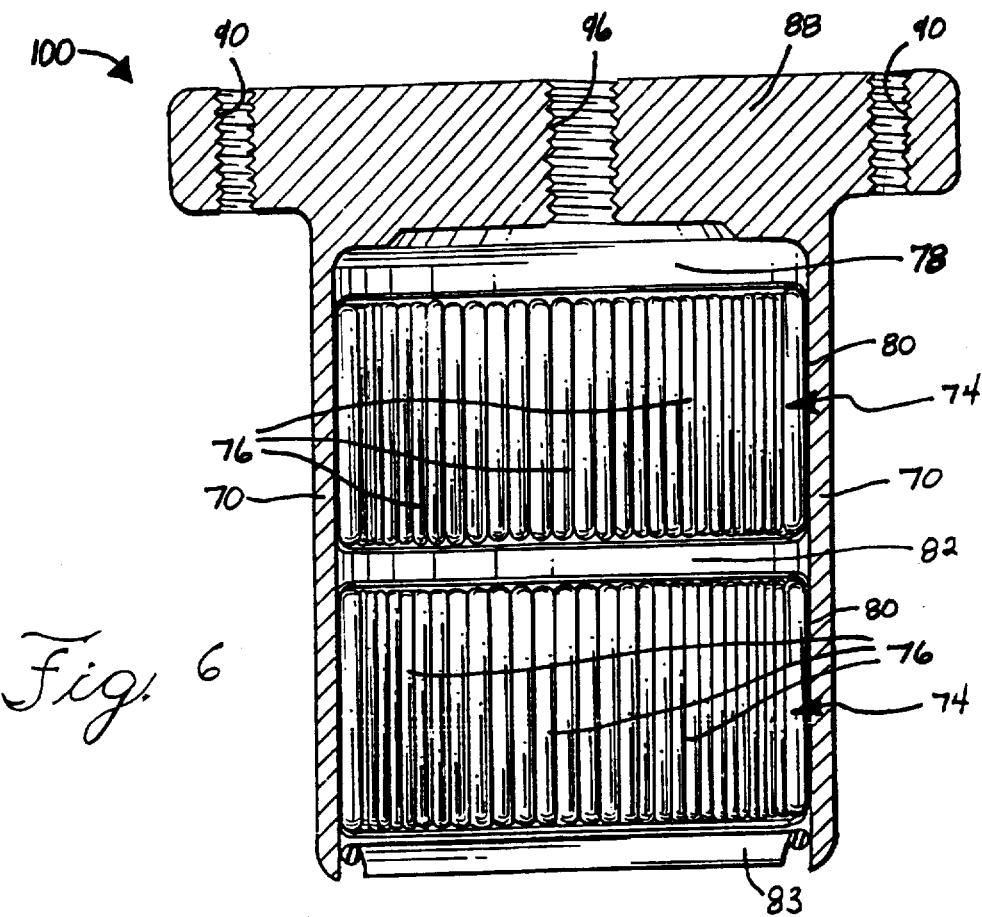
FIG. 6 is an enlarged sectional view of the knuckle cap of the kingpin assembly of FIG. 1.

The knuckle caps 100 lend themselves to retrofitting into existing kingpin and steering spindle arrangements to replace the conventional bushings. For retrofitting in applications wherein the original manufacture used thick bushings, the steering spindle bores 27 and 29 will be larger than the axle bore 34. In such applications, it is not necessary to use kingpin ends of reduced diameter. That is, since the steering spindle bores are larger, they can accommodate a larger sleeve, which thereby provides a larger internal portion 78 into which the kingpin ends are receivable. In such applications, it may be desirable to employ a kingpin whose end portions are not of reduced diameter relative to the central portion, called a "straight kingpin" 36a, as illustrated in FIGS. 4 and 5. The knuckle caps 100 employed for the straight kingpin 36a are the same as the knuckle caps employed for the kingpins 36 with end portions 40 and 42 of reduced diameter discussed above, but are proportioned to accommodate a larger kingpin end. FIG. 5 shows a pair of knuckle caps 100 in spaced relation from a straight kingpin 36a, and FIG. 4 shows the pair of knuckle caps 100 in engagement with the straight kingpin 36a.

Figure 7:
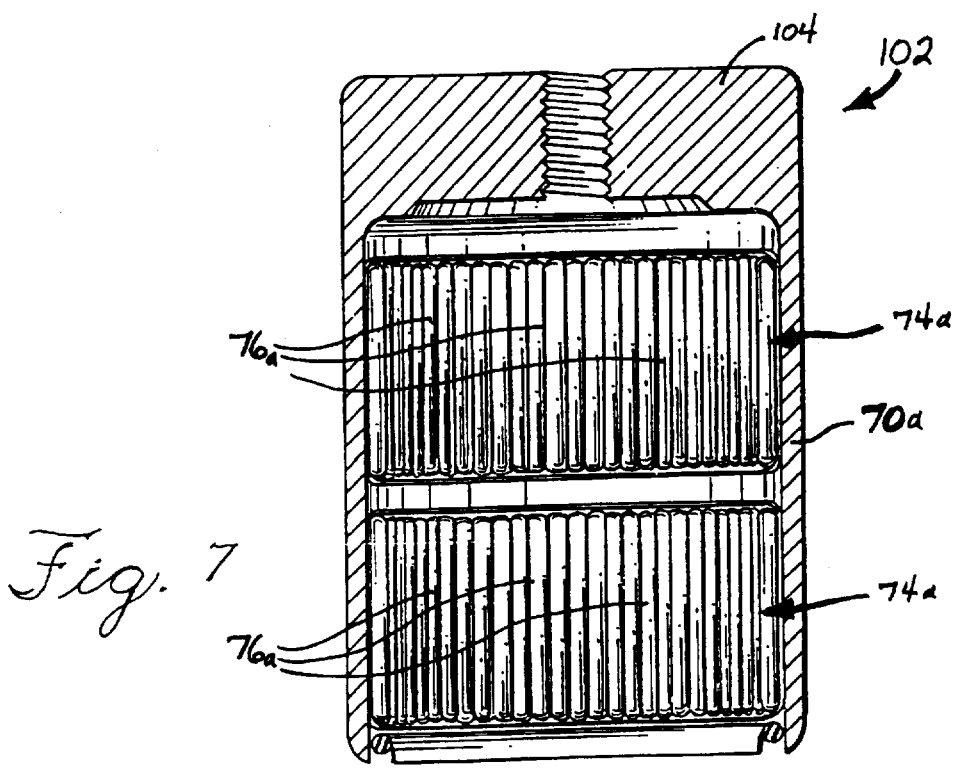
FIG. 7 is an enlarged sectional view of an alternative knuckle cap suitable for use with the kingpin assembly of the present invention.

Another knuckle cap 102 is illustrated in FIG. 7. The knuckle cap 102 of FIG. 7 has a sleeve 70a and a pair of spaced-apart roller bearings 74a, and is the same as the knuckle cap 100 of FIGS. 1-3 discussed above except that the integral cap 104 sealing the end of the sleeve 70a does not extend radially outwardly beyond the outer periphery of the sleeve. Hence, there are no threaded apertures in the sealing cap for receiving bolts to bolt the sleeve in place. The knuckle caps 102 are force-fitted into place within respective steering spindle bores.

While only specific embodiments of the invention have been described and shown, it is apparent that various alterations and modifications can be made without departing from the inventive concepts of the invention. It is, therefore, the intention in the appended claims to cover all such modifications and alterations as may fall within the scope and spirit of the invention.

What is claimed is:

1. A kingpin assembly, comprising:

an axle having an upper side and a lower side, and an end portion with a generally vertically extending bore;

a steering spindle having integral upper and lower yokes positioned at said axle end portion and adjacent respective said upper and lower sides of the axle, the upper and lower yokes of the steering spindle having internal surfaces defining respective upper and lower steering spindle bores in registration with said axle bore;

a substantially cylindrical kingpin having a central portion disposed within the axle bore, and a pair of opposite, cylindrical end portions received within said respective upper and lower steering spindle bores, the end portions having peripheral surfaces in spaced relation from the internal surfaces of the respective upper and lower steering spindle bores to define an annular gap between the peripheries of the kingpin end portions and the internal surfaces of the respective upper and lower steering spindle bores;

a pair of keepers engaged with the axle and the central portion of the kingpin to secure the central portion of the kingpin in substantially stationary position within the axle bore;

a tapered thrust washer disposed between the lower side of the axle end portion and the lower yoke;

first and second annular sleeves each having an interior wall defining a cylindrical hollow internal sleeve bore and being secured within the respective steering spindle bore, with each of said first and second sleeves being secured within a respective one of said upper and lower steering spindle bores and received in said annular gaps between the peripheries of the kingpin end portions and the internal surfaces defining the respective steering spindle bores;

a pair of metal roller bearings mounted in the sleeve bores of each of the first and second sleeves in spaced relation with respect to one another, with the metal roller bearings having internal metal rolling elements;

a grease reservoir in each of said first and second sleeves in a region between said pair of metal roller bearings for receiving grease and retaining grease for lubrication of the rolling elements;

precisely machined and highly polished, cylindrical surfaces on the peripheries of the kingpin end portions machined to predetermined tolerances to have a close fit with the respective said internal metal rolling elements to reduce road pounding motion therebetween and being highly polished to provide smooth rolling engagement with the internal metal rolling elements; and precisely machined and highly polished, inner cylindrical surfaces on said first and second sleeves with the internal metal rolling elements rolling with respect to the highly polished, cylindrical surfaces on the kingpin end portions and sleeve inner surfaces for low friction oscillatory movement of the steering spindle with respect to the end portion of the axle.

2. A kingpin assembly in accordance with claim 1 in which the sleeves each have an integral, cap end defining a sealing flange for securing to a respective one of said upper and lower steering spindle yokes to seal the respective spindle bore and secure the sleeve in a substantially stationary position within the respective spindle bore.

3. A kingpin assembly in accordance with claim 2 wherein a screw is threaded into a threaded bore in the capped end, and the threaded bore is aligned with an end of the kingpin so that a force fit removal screw may be threaded in the threaded bore and abutted against the kingpin to pull the sleeve from the steering spindle bore.

4. A kingpin assembly in accordance with claim 1 in which:

the sleeves have a cap end with the cap end of each said sleeve having an opening for receiving said grease;

said pair of roller bearings each comprising a first roller bearing disposed in proximity with said capped end and a second roller bearing disposed distally from said capped end, said grease reservoir being disposed in the region between the first and second roller bearings; and said first roller bearing of both the first and second sleeves allowing passage of said grease therepast into the grease reservoir for said lubrication of the rolling elements.

5. A kingpin assembly in accordance with claim 1 in which the sleeves and roller bearings are slidably removable and insertable into their respective said upper and lower steering spindle bores as a single, integral cartridge unit.

6. A kingpin assembly in accordance with claim 1 in which the central portion of the kingpin is of predetermined diameter and the end portions of the kingpin are of reduced diameter relative to the central portion.

7. A kingpin assembly in accordance with claim 1 in which seals are provided at the ends of the sleeves for keeping out foreign material and for retaining said grease within the sleeves.

8. A kingpin assembly in accordance with claim 5 in which an inner shoulder is formed on an inner end of the sleeves to pull the bearings from one end of the spindle when the cartridge unit is being removed.

9. A kingpin assembly in accordance with claim 8 in which the pair of longitudinally spaced keepers are provided on the kingpin for withstanding loads associated with heavy duty vehicles.

10. A kingpin assembly for pivotally connecting a steering spindle, having upper and lower yokes with respective steering spindle bores, to an end portion of an axle, having an axle bore, wherein the steering spindle bores are registrable with the axle bore, the kingpin assembly comprising:

a kingpin having a central portion and a pair of opposite end portions;

highly polished and precisely machined, cylindrical surfaces on the end portions of the kingpin;

bearing cartridges for insertion into each one of said bores of the steering spindle to provide low frictional rotation of the steering spindle about the end portions of the kingpin extending into the steering spindle bores, each of the bearing cartridges comprising:

a body having a cap end;

a cylindrical sleeve on said body depending from said cap end and adapted for slidable receipt into the respective steering spindle bore;

a highly polished, precisely machined, internal bore surface on said cylindrical sleeve; and a pair of metal roller bearings disposed internally in each of the depending cylindrical sleeves and adapted for telescopic engagement about the kingpin end portions and in rolling engagement with the respective highly polished, precisely machined cylindrical surfaces on the kingpin end portions and on the cylindrical sleeves; the pair of metal roller bearings being spaced apart to define a grease reservoir in a region between the spaced metal roller bearings for retaining grease.

11. A kingpin assembly in accordance with claim 10 in which a seal is provided at an end of each of the respective sleeves for keeping out foreign material and for retaining the grease within each of the sleeves.

12. A kingpin assembly in accordance with claim 10 wherein a threaded bore is formed in the center of each of the cap ends to receive a screw to abut an outer end face of the kingpin and to pull the cartridges from the kingpin.

13. A kingpin assembly in accordance with claim 10 wherein an inner shoulder on each of the sleeves abuts inner ends of the roller bearings to pull the roller bearings from the kingpin end portions when the cartridges are being removed.

14. A method of providing an improved bearing system for kingpin assemblies, said method comprising the steps of:

providing highly polished, cylindrical surfaces on ends of a kingpin to be journaled for rotation in bores of a spindle;

contacting the highly polished, cylindrical kingpin ends with upper and lower roller bearing elements each comprised of a pair of metallic spaced upper and lower bearings and sliding the upper and lower roller bearing elements axially along the highly polished, cylindrical kingpin ends;

holding the roller bearing elements against highly polished, cylindrical surfaces on end caps while sliding the roller bearing elements along the highly polished, cylindrical surfaces on the ends of the kingpin;

providing lubricant in a space between each said pair of upper and lower bearings; and securing the end caps to the spindle to retain the upper and lower bearing elements in contact with the highly polished, cylindrical surfaces on the end caps and with the highly polished, cylindrical surfaces on the kingpin ends.

* * * * *